(No Model.)
J. H. FLETCHER, C. O. KIMBALL & A. C. CLARK.
MUD AND DIRT PROTECTOR AND SCREEN FOR BICYCLES.
No. 558,938.  Patented Apr. 28, 1896.
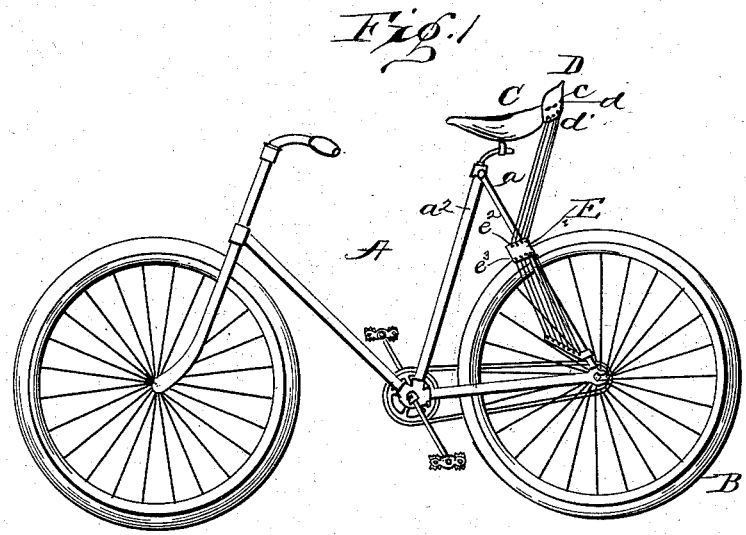
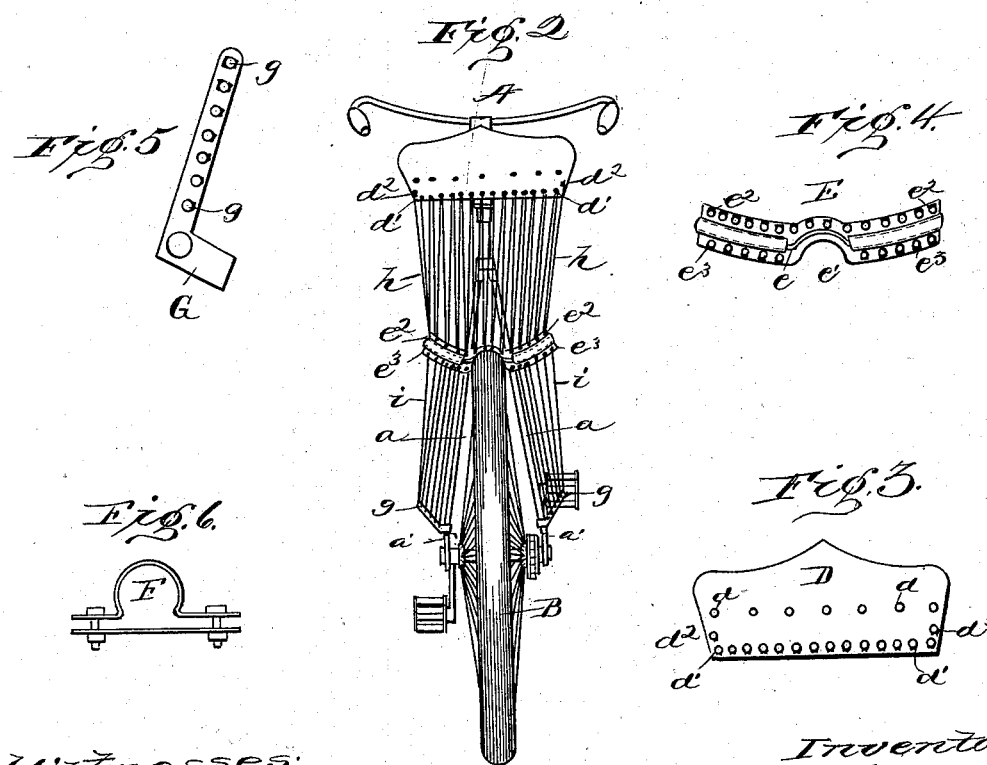

UNITED STATES PATENT OFFICE.

JAMES H. FLETCHER, CHARLES O. KIMBALL, AND ARTHUR C. CLARK, OF LITTLE ROCK, ARKANSAS.

MUD AND DIRT PROTECTOR AND SCREEN FOR BICYCLES.

SPECIFICATION forming part of Letters Patent No. 558,938, dated April 28, 1896.

Application filed August 21, 1895. Serial No. 560,046. (No model.)

*To all whom it may concern:*

Be it known that we, JAMES H. FLETCHER, CHARLES O. KIMBALL, and ARTHUR C. CLARK, citizens of the United States, residing at Little Rock, in the county of Pulaski and State of Arkansas, have invented certain new and useful Improvements in Mud and Dirt Protectors and Screens for Bicycles; and we do hereby declare the following to be a full, clear, and exact description of the invention, such as will enable others skilled in the art to which it appertains to make and use the same.

Our invention is a protector against mud and dirt and serves as a screen for bicycles as well as a dust or mud protector, and it takes the place of bloomers and is adapted to be used on bicycles either for ladies or gentlemen; and it consists of a screen composed of a back to the saddle and means to attach to the lower edge of said back and to the two rear braces of such bicycle canvas, cord, ribbons, or other suitable material to prevent the mud or water thrown from the rear wheel of the bicycle from splashing the clothes of the rider.

In the accompanying drawings, Figure 1 is a side elevation of a bicycle with our invention attached thereto. Fig. 2 is a rear elevation of a bicycle with our invention attached thereto. Figs. 3, 4, 5, and 6 are detail views.

Our invention is described as follows:

A represents the bicycle, which may be either a lady's or gentleman's bicycle.

B represents the rear wheel.

$a\ a$ represent the rear upright rods, provided at their lower ends with bearings $a'$, in which the wheel B is journaled, the upper ends of said rods being secured to the vertical rods $a^2$.

C represents the usual bicycle-saddle. To the rear part of said saddle is secured eyelet-hooks $c$, such as are usually secured to shoes. To the rear part of said saddle C is secured a back D. Said back D is provided with perforations or slots $d$, which are hooked over the hooks $c$. To the lower edge of said back D are secured eyelet-hooks $d'$, and at each end is secured one or more eyelet-hooks $d^2$. To the rods $a\ a$ is secured a half-belt E, stiffened by a rod of steel $e$. Said belt is provided with an arch $e'$ to accommodate the periphery of the wheel B. The upper edge of said belt is provided with eyelet-hooks $e^2$ and the lower edge with eyelet-hooks $e^3$. Said belt is secured to the rods $a\ a$ by means of clips F. To the lower end of said rods $a$, and just above the bearings $a'$, are secured, by means of clips F, strips G. Said strips are provided with eyelet-hooks $g$. When these three parts D, E, and G are put in place, a cord $h$ is run through the hooks $d'$, $d^2$, and $e^2$ and secured, and two other cords $i$ are run through the hooks $e^3$ and $g$ and secured.

The saddle C may be adjusted backward or forward, in which case the cord $h$ may be untied at one end and tightened or slackened a little to suit.

It will be seen that this protector is quite ornamental and very light and may be adjusted to any bicycle now in use.

We do not confine ourselves strictly to the material used or to the particular shape of the parts described, but claim all mechanical equivalents thereof.

It is evident that instead of using cords $h$ and $i$ we may use ribbon or other like material, or we may use canvas, plain or ornamental.

Having described our invention, what we claim as new, and desire to secure by Letters Patent, is—

1. Saddle C, provided with eyelet-hooks $c$; back $d$, provided with the perforations $d$, eyelet-hooks $d'$ and $d^2$; half-belt E, provided with the stiffening-rod $e$, arch $e'$, eyelet-hooks $e^2$ and $e^3$; strips G, provided with eyelet-hooks $g$; clip F, securing the parts E and G, in place; cord $h$, worked in the eyelet-hooks $d'$, $d^2$ and $e^2$; cords $i$, worked in the hooks $e^3$ and $g$, substantially as shown and described and for the purposes set forth.

2. Saddle C, having adjustably secured thereto a back D; half-belt E, secured to the rods $a$, just above the wheel B, by clips F, or other suitable means; strips G, secured to the lower ends of rods $a$, by clips F, or other suitable means; said parts D, E and G, provided with means whereby screens may be secured to the rear face of said parts, substantially as shown and described and for the purposes set forth.

In testimony whereof we affix our signatures in presence of two witnesses.

JAMES H. FLETCHER.
CHARLES O. KIMBALL.
ARTHUR C. CLARK.

Witnesses:
SAM CLARK,
MORGAN REASOR.